United States Patent
Wang et al.

(10) Patent No.: US 10,884,784 B2
(45) Date of Patent: Jan. 5, 2021

(54) SYSTEMS AND METHODS OF EFFICIENTLY INTERRUPTING VIRTUAL MACHINES

(71) Applicant: INTEL CORPORATION, Santa Clara, CA (US)

(72) Inventors: Kai Wang, Shanghai (CN); Bing Zhu, Shanghai (CN); Fangjian Zhong, Shanghai (CN); Yadong Qi, Shanghai (CN); Peng Zou, Shanghai (CN)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 16/648,751

(22) PCT Filed: Dec. 27, 2017

(86) PCT No.: PCT/CN2017/118920
§ 371 (c)(1),
(2) Date: Mar. 19, 2020

(87) PCT Pub. No.: WO2019/127080
PCT Pub. Date: Jul. 4, 2019

(65) Prior Publication Data
US 2020/0249983 A1    Aug. 6, 2020

(51) Int. Cl.
*G06F 9/48*    (2006.01)
*G06F 9/30*    (2018.01)
(Continued)

(52) U.S. Cl.
CPC ........ *G06F 9/4812* (2013.01); *G06F 9/30101* (2013.01); *G06F 9/45558* (2013.01);
(Continued)

(58) Field of Classification Search
CPC .. G06F 9/4812; G06F 9/30101; G06F 9/4558; G06F 12/40; G06F 2009/45579;
(Continued)

(56) References Cited

U.S. PATENT DOCUMENTS 8,909,946 B2 * 12/2014 Oney .................. G06F 9/442
                                                                713/300
9,411,625 B2 *  8/2016 Chang ................. G06F 9/3867
(Continued)

FOREIGN PATENT DOCUMENTS

WO    2019127080 A1    7/2019

OTHER PUBLICATIONS

International Search Report and Written Opinion received for PCT Application No. PCT/CN2017/118920, dated Sep. 28, 2018. 9 pages.

(Continued)

*Primary Examiner* — Henry Tsai
*Assistant Examiner* — Christopher A Daley
(74) *Attorney, Agent, or Firm* — Finch & Maloney PLLC (57) ABSTRACT

The systems and methods for enabling a lightweight VMM to efficiently interrupt virtual machines are provided. In some examples, the lightweight VMM is configured to utilize a self IPI to deliver external interrupts to the virtual machines. The self IPI may be generated by writing one or more values, including an identifier of the external interrupt, to an ICR of a programmable interrupt controller. The programmable interrupt controller may retrieve the one or more values from the ICR, identify the external interrupt and process the external interrupt, which culminates in the external interrupt being written to an IDT of a virtual machine targeted for interrupt delivery by the lightweight VMM.

20 Claims, 6 Drawing Sheets

(51) Int. Cl.
*G06F 9/455* (2018.01)
*H04L 12/40* (2006.01)

(52) U.S. Cl.
CPC .... *H04L 12/40* (2013.01); *G06F 2009/45579* (2013.01); *G06F 2009/45587* (2013.01); *H04L 2012/40215* (2013.01); *H04L 2012/40273* (2013.01)

(58) Field of Classification Search
CPC . G06F 2009/45587; H04L 2012/40215; H04L 2012/40273
See application file for complete search history.

(56) References Cited

U.S. PATENT DOCUMENTS

| | | | | |
|---|---|---|---|---|
| 10,129,106 | B2* | 11/2018 | Cropper | H04L 41/5054 |
| 10,417,102 | B2* | 9/2019 | Sanakkayala | G06F 11/301 |
| 2006/0294518 | A1* | 12/2006 | Richmond | G06F 9/45558 |
| | | | | 718/1 |
| 2013/0042236 | A1 | 2/2013 | Kagan | |
| 2014/0082240 | A1 | 3/2014 | Coleman et al. | |
| 2016/0098289 | A1 | 4/2016 | Lim et al. | |

OTHER PUBLICATIONS

Nakajima, Jun, "Enabling Optimized Interrupt/APIC Virtualization in KVM," Intel Open Source Technology Center, Nov. 8, 2012. 15 pages.
"Intel® 64 Architecture x2APIC Specification," Reference No. 318148-004. Mar. 2010. 35 pages.
Shah, P. and Patil, R., "Hardware-assisted Virtualization," 15-612 Operating System Practicum, Carnegie Mellon University. Mar. 31, 2015. 28 pages.
"Intel 64 and IA-32 Architectures Software Developer's Manual," Chapter 6—Safer Mode Extensions Reference. Sep. 2016. 42 pages.
"Intel 64 and IA-32 Architectures Software Developer's Manual," Chapter 29—Apic Virtualization and Virtual Interrupts. Sep. 2016. 14 pages.
"Intel 64 and IA-32 Architectures Software Developer's Manual," Chapter 23—Introduction to Virtual Machine Extensions. Sep. 2016. 108 pages.

* cited by examiner

SYSTEMS AND METHODS OF EFFICIENTLY INTERRUPTING VIRTUAL MACHINES

BACKGROUND

Benefits of hardware virtualization include flexible resource provisioning, hardware independent operation for guest operating systems, and increased security for software applications. However, to provide these benefits, a virtualization system must include several layers of computer hardware and software. These layers may include a processor and memory, a hypervisor executed by the processor to virtualize the computer hardware, one or more guest operating systems that execute on the virtualized computer hardware, and software applications that execute with the support of the guest operating systems. The hypervisor plays a pivotal role within a virtualization system for it is the hypervisor that virtualizes the underlying hardware so that the guest operating systems may execute generally as they would in a non-virtualized system.

DETAILED DESCRIPTION

The systems and methods disclosed herein enable a lightweight VMM to efficiently interrupt virtual machines that it monitors and controls. More particularly, in some examples, the lightweight VMM is configured to utilize a self inter-processor interrupt (IPI) to deliver external interrupts to the virtual machines. In certain examples, the self IPI is generated by writing one or more values, including an identifier of the external interrupt, to an interrupt command register (ICR) of a programmable interrupt controller. This programmable interrupt controller may be an advanced programmable interrupt controller (APIC). In some examples, the programmable interrupt controller retrieves the one or more values from the ICR, identifies the external interrupt and processes the external interrupt, which culminates in the external interrupt being written to an interrupt descriptor table (IDT) of a virtual machine targeted for interrupt delivery by the lightweight VMM.

This technique to delivering interrupts prevents an unnecessary VM Exit that other techniques incur. A VM Exit is a context swapping activity that is computing resource intensive and, therefore, degrades overall system performance. By using a self IPI to deliver an external interrupt to an IDT of a virtual machine, the examples disclosed herein emulate a non-virtual computing environment, thus allowing the targeted virtual machine to process the external interrupt as it would if executing on a non-virtualized computing device and without requiring a VM Exit.

In some examples, the lightweight VMM monitors and controls its own operation and the operation of the virtual machines by allocating and populating a virtual machine control structure (VMCS). The VMCS is a data structure comprising various fields. In some examples, the lightweight VMM writes values into its VMCS that prevent it, during execution, from trapping and processing external interrupts. In these examples, such external interrupt processing is delegated to the virtual machines and their guest operating systems. This approach simplifies the lightweight VMM because the VMM has no need to execute the complex logic required to virtualize the programmable interrupt controller. This approach may also decrease the size of the trusted computing base (TCB), depending on the application of a computing device.

In some examples, the lightweight VMM monitors and controls a trusted execution environment (TEE) executing within the computing device. In these examples, the lightweight VMM can provide the TEE with additional security by virtualizing hardware components that execute the TEE or with which the TEE communicates with other components. For instance, in some embodiments, the lightweight VMM virtualizes memory of the computing device, thereby preventing data stored in the memory by one virtual machine from being accessed by another virtual machine. Further, where the data stored in the memory is used for communication between the processor of the computing device and an input/output (I/O) device (e.g., where the I/O device use DMA to store data in the memory), virtualization of the memory can be used to isolate the I/O device from other virtual machines. However, should the VMM encounter data generated by the I/O device that needs to be processed by a virtual machine, the VMM can initiate such processing efficiently by delivering an external interrupt to the virtual machine via the techniques disclosed herein. In at least one example, the VMM implements I/O device isolation within an embedded system of a vehicle include a controller area network (CAN) bus controller.

Still other aspects, embodiments and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. References to "an embodiment," "other embodiments," "an example," "some embodiments," "some examples," "an alternate embodiment," "various embodiments," "one embodiment." "at least one embodiment," "another embodiment," "this and other embodiments" or the like are not necessarily mutually exclusive and are intended to indicate that a particular feature, structure, or characteristic described in connection with the embodiment or example may be included in at least one embodiment or example. The appearances of such terms herein are not necessarily all referring to the same embodiment or example. Any embodiment or example disclosed herein may be combined with any other embodiment or example.

Also, the phraseology and terminology used herein is for the purpose of description and should not be regarded as limiting. Any references to examples, embodiments, components, elements, or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

General Overview

Conventional techniques for delivering external interrupts to virtual machines consume substantial computing resources. VMMs that virtualize substantially all the hardware of a computing device are required to implement complex logic that emulates not only a processor and memory, but also other specialized hardware, such as programmable interrupt controllers. While such fully functional VMMs may be appropriate for some applications (e.g., data center servers with substantial computing power), they may be inappropriate for others, where concurrent use of hardware is infrequent (e.g., embedded systems).

Thus, and in accordance with at least some embodiments disclosed herein, a computing device implements a lightweight VMM that virtualizes only a subset of the hardware components of the computing device. For instance, the lightweight VMM avoids virtualizing any programmable logic controller resident in the computing device and, therefore, does not process external interrupts processed by the programmable logic controller. However, because delivering external interrupts to virtual machines is helpful to the lightweight VMM in implementing certain functionality, the lightweight VMM executes techniques that enable it to do so without cause a computationally costly VM Exit.

Delivery of External Interrupts Via a Lightweight VMM

Figure 1:
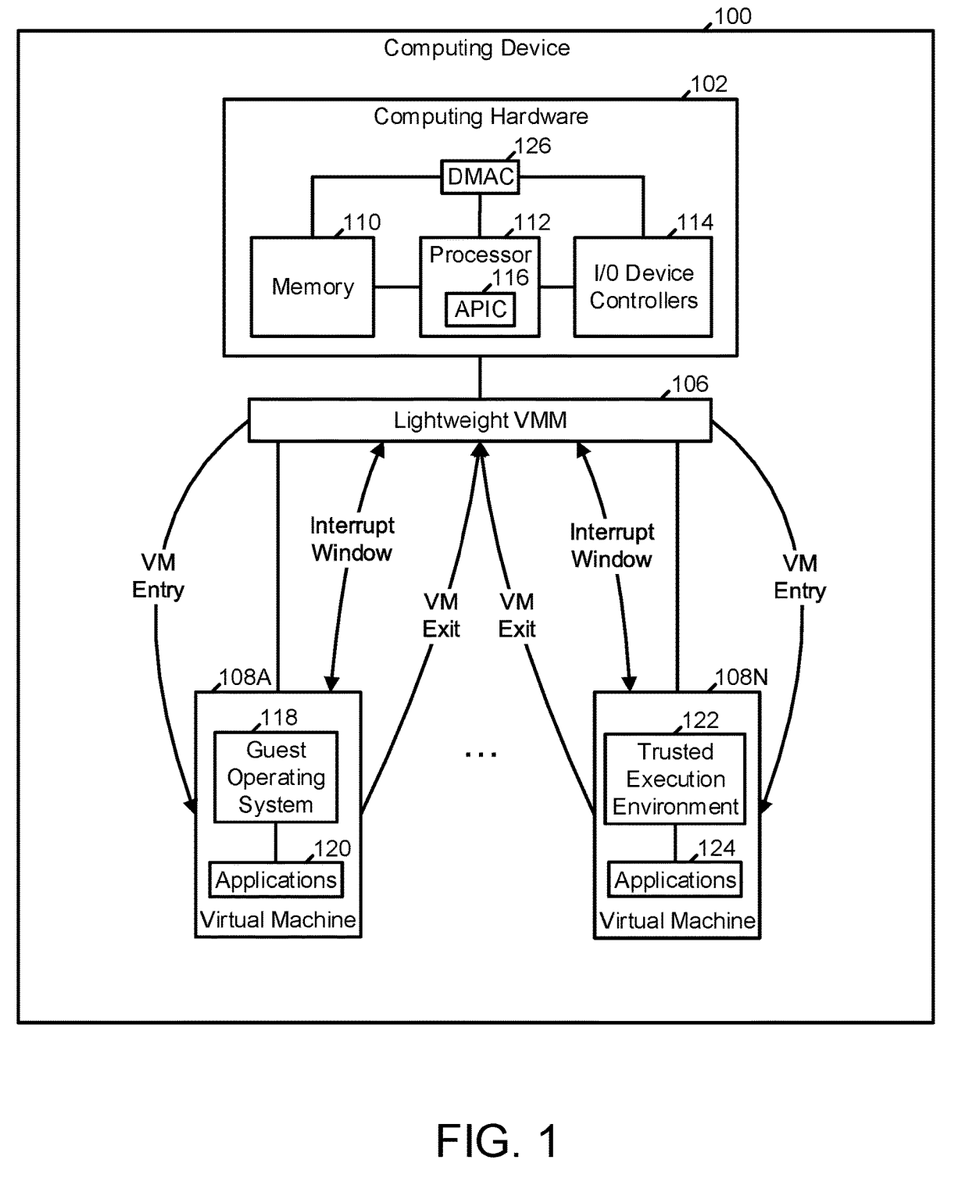
FIG. 1 is a block diagram illustrating computing device implementing a lightweight virtual machine monitor in accordance with an example of the present disclosure.

FIG. 1 illustrates one example of a computing device 100 that is configured to enable a lightweight VMM to deliver an interrupt to one or more VMs. As shown, the computing device 100 includes computing hardware 102, a lightweight VMM 106, and a plurality of VMs 108A-108N (referred to in the collective as the VMs 108 and as generic individuals as a VM 108). The computing hardware 102 includes a memory 110, a processor 112, I/O device controllers 114, and a direct memory access controller (DMAC) 126. These computing hardware 102 components are coupled to one another via an interconnect, such as a system bus, which is illustrated by lines connecting the components. As shown in FIG. 1, the processor 112 includes a local APIC 116 that is also connected to the interconnect. Each of the VMs 108 executes a guest operating system (e.g., Linux, Solaris, Windows, AIX, or FreeBSD). As shown, the VM 108A executes a guest operating system 118 that supports execution of the applications 120. The VM 108N executes a TEE 122 that supports execution of the applications 124.

The processor 112 includes various computing circuitry, such as a control unit, an arithmetic-logic unit, and register memory, configured to execute instructions defined by an instruction set supported by the processor 112. In executing the instructions, the processor 112 may operate on data stored in the register memory thereby generating manipulated data. The processor 112 may included a single core processor, a multicore processor, a micro-controller, or some other data processing device. To implement and/or control specialized components in some embodiments, the processor 112 executes a series of instructions (i.e., one or more programs). The processor 112 is coupled to and configured to communicate data with the memory 110 and the I/O device controllers via an interconnection mechanism, such as a bus or some other data connection. This interconnection mechanism is represented in FIG. 1 by lines connecting the components within the computing hardware 102. In operation, the processor 112 causes data and/or encoded instructions to be read from a non-volatile data storage medium in the memory 110 and written to high performance data storage, such as register memory. The processor 112 manipulates the data and/or executes the encoded instructions within the high-performance data storage and copies the manipulated data to the data storage medium after processing is completed. In at least some examples, the processor 112 supports Intel® Virtualization Technology, including the VMX instruction set. The APIC 116 includes circuitry configured to receive and process various hardware and/or software interrupts. The DMAC 126 includes circuitry configured to receive and process direct memory access (DMA) requests.

The memory 110 may incorporate volatile and/or non-volatile data storage (e.g., read-only memory, random access memory, flash memory, and/or some other computer readable and writable medium). The memory 110 is sized and configured to store programs executable by the processor 112 and, in some examples, some of the data used by the programs during execution. Examples of the memory 108 include Read Only Memory (ROM), Random Access Memory (RAM). Dynamic Random Access Memory (DRAM), and Static RAM (SRAM).

The I/O device controllers 114 control external input and or output devices. Examples of I/O device controllers 114 include universal serial bus (USB) controllers, peripheral component interconnect (PCI) controllers, industry standard architecture (ISA) controllers, CAN bus controllers, and the like.

As shown in FIG. 1, the processor 112 is configured to implement the lightweight VMM 106 and the VMs 108. In general, the lightweight VMM 106 is configured to virtualize elements of the computing hardware 102 and to manage execution of the VMs 108. In some examples, the lightweight VMM 106 virtualizes the memory 110 and the processor 112, but does not virtualize the APIC 116. Omitting the APIC 116 from its scope of virtualization enables the lightweight VMM 106 to maintain a smaller, simpler, and more efficient code base. Omitting the APIC from its scope of virtualization also enables the lightweight VMM 106 contribute to smaller TCB size within a given application.

Regarding VM control, in some examples the lightweight VMM 106 is configured to allocate a VMCS to govern its own operation and to allocate separate VMCSs to govern the execution of the VMs 108. The VMCS is a data structure comprising a variety of fields, some of which are described further below. With at least its own VMCS in place, the VMM 106 can initiate virtualized operation of the processor 112 (e.g., by executing a VMXON instruction), initiate sequential execution of the VMs 108 (e.g., by executing a VMLAUNCH OR VMRESUME instruction), and/or terminate virtualized operation of the processor 112 (e.g., by executing a VMXOFF instruction).

As illustrated in FIG. 1, the lightweight VMM 106 is configured to request an interrupt window with any of the VMs 108 that the lightweight VMM 106 has targeted for external interrupt delivery.

Being a lightweight VMM as described above, the lightweight VMM 106 is configured to not trap external interrupts from the I/O device controllers 114 or to handle external interrupts. Rather the lightweight VMM 106 is configured to allow the guest operating system of the active VM 108 to perform these functions. In at least one example, the lightweight VMM 106 is configured avoid external interrupt processing as described above by writing a value of 0 in bit[0] of the Pin-Based VM-Execution Controls field of the VMCS for the VMM 106.

Despite this configuration to avoid of interrupt processing, the lightweight VMM 106 may need to deliver external interrupts into a VM 108 to implement certain features (e.g., such as CAN bus isolation, as described further below with reference to FIGS. 5 and 6). Thus, in some examples, the lightweight VMM 106 is configured to deliver external interrupts using a VM-entry interrupt-information field within the VMCS of the VM 108. In these examples, to deliver an external interrupt, the lightweight VMM 106 is configured to write an identifier of the external interrupt (e.g., a vector) in the VM-entry interrupt-information field. Further, in these examples, the processor 112 is configured to, upon the next VM Entry to the VM 108, fetch the identifier of the external interrupt stored in the VM-entry interrupt-information field and vector a virtual interrupt through the IDT of the VM 108.

Figure 2:
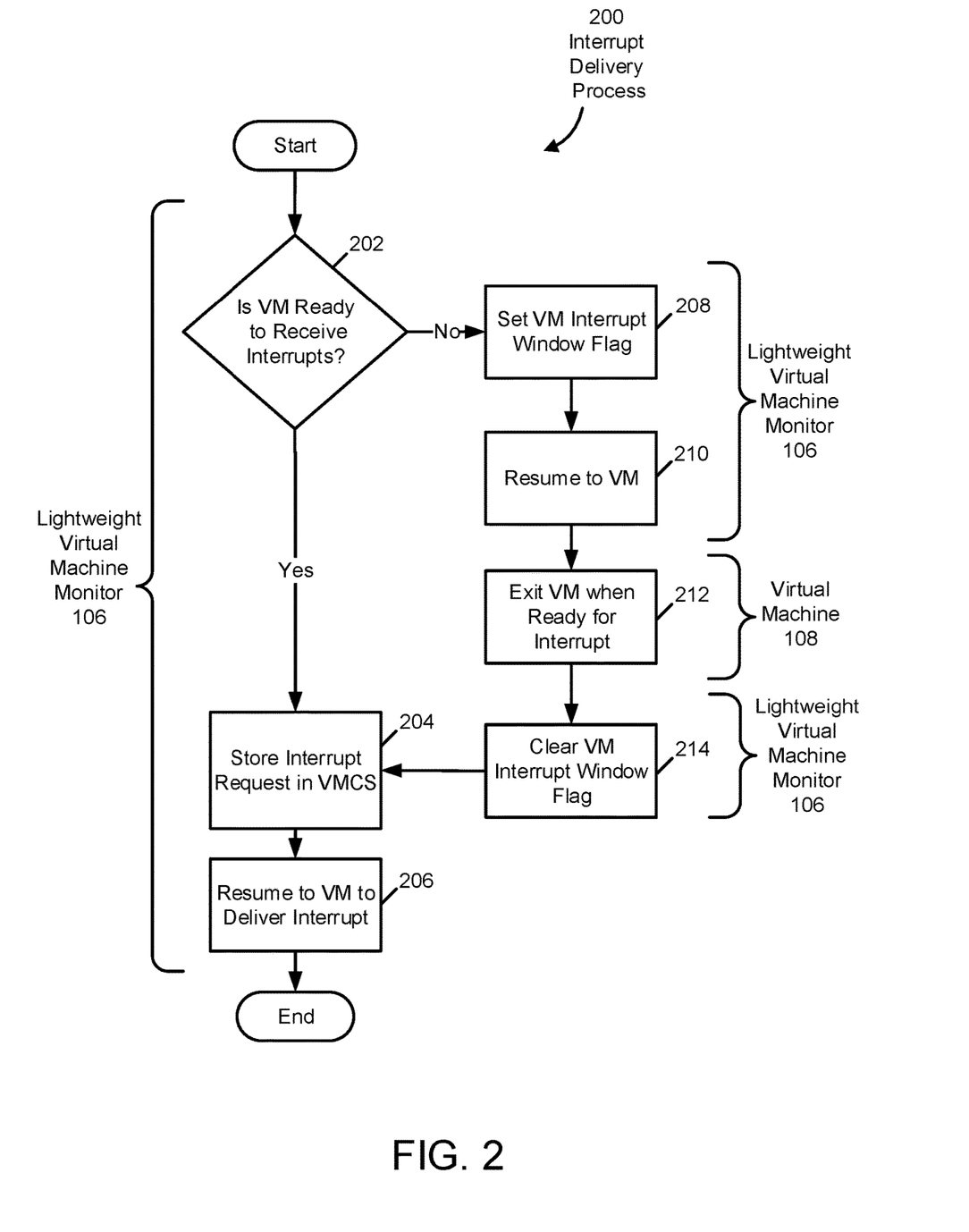
FIG. 2 is a flow diagram illustrating an interrupt delivery process executable by the computing device of FIG. 1 in accordance with an example of the present disclosure.

However, in some situations, the VM 108 may be configured to mask external interrupts (e.g., by having a value of 0 stored in bit[9] of the RFLAGS Register field of the VMCS for the VM 108). In this situation, the processor 112 is configured to ignore the contents of the VM-entry interrupt-information field during VM Entry and, therefore, attempting to deliver external interrupts using the VM-entry interrupt-information field as described above may fail. For this reason, in some examples, the lightweight VMM 106 is configured to initiate a process that delivers external interrupts into a VM 108 using an interrupt window. FIG. 2 illustrates an example of such an interrupt delivery process 200 that is executable by the computing device 100.

As shown in FIG. 2, the interrupt delivery process 200 starts in act 202 with the lightweight VMM 106 determining whether the VM 108 is ready to receive interrupts. For example, the VM 108 may be inactive. If the VM 108 is ready to receive interrupts, the lightweight VMM 106 executes act 204. Otherwise, the lightweight VMM 106 executes act 208.

In the act 208, the lightweight VMM 106 requests that the VM 108 exit when the VM 108 is ready to accept an interrupt. For instance, in some examples, the lightweight VMM 106 sets an interrupt window flag for the VM 108 by writing a value of 1 in bit[2] of the Processor-Based VM-Execution Controls field of the VMCS for the VM 108. In act 210, the lightweight VMM 106 resumes to the VM 108. In act 212, the VM 108 executes until ready to receive an interrupt and then exits to open the interrupt window, which generates a VM Exit. After the VM Exit is complete, the VM 108 is ready to receive interrupts. In act 214, the lightweight VMM 106 clears the interrupt window flag by, for example, writing a value of 0 in bit[2] of the Processor-Based VM-Execution Controls field of the VMCS for the VM 108.

In the act 204, the lightweight VMM 106 writes an identifier of the external interrupt in the VM-entry interrupt-information field of the VMCS for the VM 108. In act 206, the lightweight VMM 106 resumes to the VM 108, thereby causing a VM Entry that delivers the interrupt into the VM 108 as described above, and the interrupt delivery process 200 ends.

The interrupt delivery process 200 enables a lightweight VMM to reliably deliver external interrupts into a monitored VM. However, the interrupt delivery process 200 accomplishes this by causing the monitored VM to generate a VM Exit, at least in some cases. This operation is computing resource intensive. Therefore, other examples include computing devices configured to implement interrupt delivery processes that do not cause a VM Exit.

Figure 3:
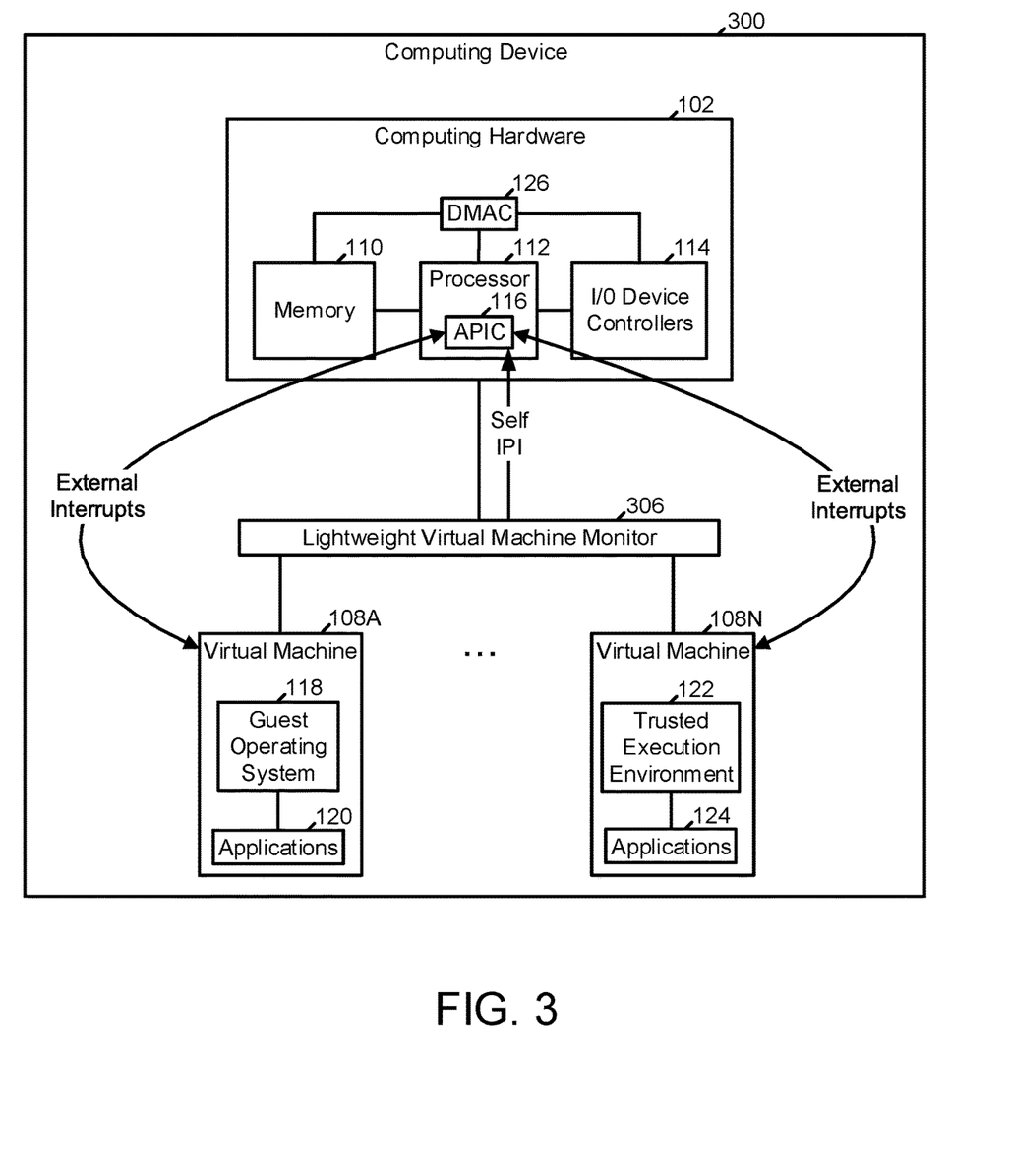
FIG. 3 is a block diagram illustrating computing device implementing another lightweight VMM in accordance with an example of the present disclosure.

FIG. 3 illustrates one example of a computing device 300 that is configured to enable a lightweight VMM to provide an interrupt to one or more VMs without causing a VM Exit. As shown, the computing device 300 includes many of the components illustrated in FIG. 1. These components are structured and function within the computing device 300 as they do within the computing device 100.

As shown in FIG. 1, the processor 112 is configured to implement the lightweight VMM 306 and the VMs 108. In general, the lightweight VMM 306 is configured to virtualize elements of the computing hardware 102 and to manage execution of the VMs 108. In some examples, the lightweight VMM 306 virtualizes the memory 110 and the processor 1112, but does not virtualize the APIC 116. Omitting the APIC 116 from its scope of virtualization enables the lightweight VMM 306 to maintain a smaller, simpler, and more efficient code base. Omitting the APIC from its scope of virtualization also enables the lightweight VMM 306 contribute to smaller TCB size within a given application.

Regarding VM control, in some examples the lightweight VMM 306 is configured to allocate a VMCS to govern its own operation and to allocate separate VMCSs to govern the execution of the VMs 108. With at least its own VMCS in place, the VMM 306 can initiate virtualized operation of the processor 112 (e.g., by executing a VMXON instruction), initiate sequential execution of the VMs 108 (e.g., by executing a VMLAUNCH OR VMRESUME instruction), and/or terminate virtualized operation of the processor 112 (e.g., by executing a VMXOFF instruction).

Being a lightweight VMM as described above, the lightweight VMM 306 is configured to not trap external interrupts from the I/O device controllers 114 or to handle external interrupts. Rather the lightweight VMM 306 is configured to allow the guest operating system of the active VM 108 to perform these functions. In at least one example, the lightweight VMM 306 is configured avoid external interrupt processing as described above by writing a value of 0 in bit[0] of the Pin-Based VM-Execution Controls field of the VMCS for the VMM 306.

Despite this configuration to avoid of interrupt processing, the lightweight VMM 306 may need to deliver external interrupts into a VM 108 to implement certain features (e.g., such as CAN bus isolation, as described further below with reference to FIGS. 5 and 6). Thus, in some examples, the lightweight VMM 306 is configured to deliver external interrupts using a self IPI. These examples leverage the fact that a VM 108 executes at ring 0 when implemented using the VMX instruction set. As such, a VM 108 receives any self IPI generated by the lightweight VMM 306 while the VM 108 is executing. Because the lightweight VMM 306 is configured to not trap or handle external interrupts, they are passed to the guest operating system of the currently executing VM 108.

Figure 4:
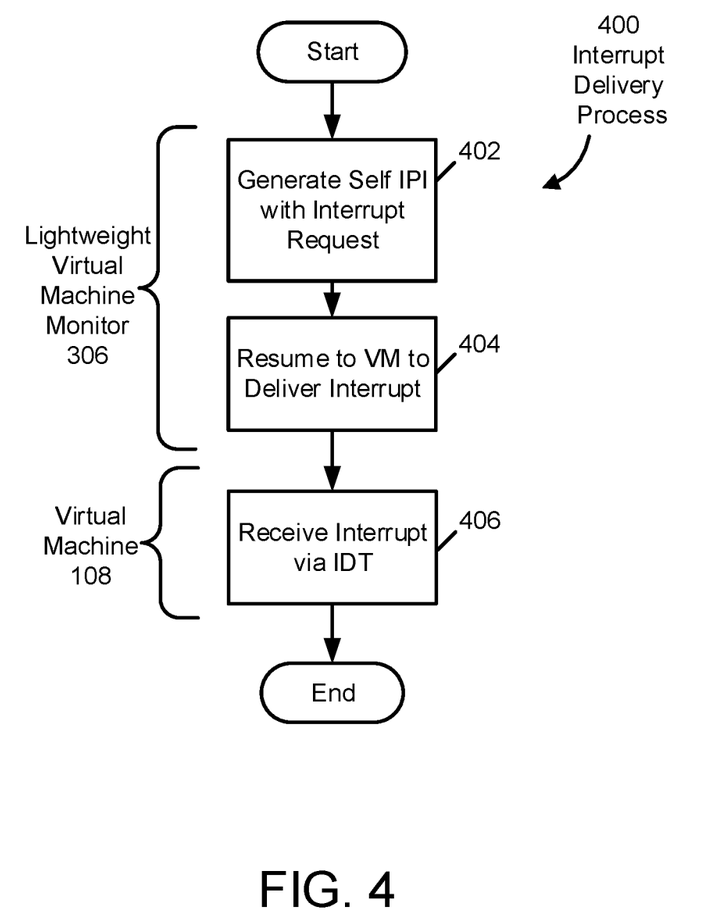
FIG. 4 is a flow diagram illustrating an interrupt delivery process executable by the computing device of FIG. 3 in accordance with an example of the present disclosure.

FIG. 4 illustrates an example of an interrupt delivery process 400 that is executable by the computing device 300 to utilize a self IPI to avoid a VM Exit. As shown in FIG. 4, the interrupt delivery process 400 starts in act 402 with the lightweight VMM 306 generating a self IPI. For example, the VMM 306 may generate a self IPI by writing appropriate values to the interrupt command register of the APIC 116. These values may include an identifier (e.g., a vector) of the external interrupt. In act 404, the lightweight VMM 306 resumes to the VM 108, thereby causing, in act 406, the external interrupt to be delivered to the VM 108 via the IDT of the VM 108, and the interrupt delivery process 400 ends. The interrupt delivery process 400 enables a lightweight VMM to reliably deliver external interrupts into a monitored VM and to do so without a superfluous VM Exit.

Vehicular Examples

The innovative systems and methods of efficiently delivering external interrupts to virtual machines disclosed herein are suited to a wide variety of applications. For instance, some examples use virtualization to provide additional security to a TEE executing in an embedded system within a vehicle. These examples isolate a CAN bus controller disposed within the vehicle by virtualizing system memory and, when appropriate, delivering external interrupts to the TEE to initiate execution of an interrupt service routine (ISR) within the TEE. FIGS. 5 and 6 illustrate aspects of these examples.

Figure 5:
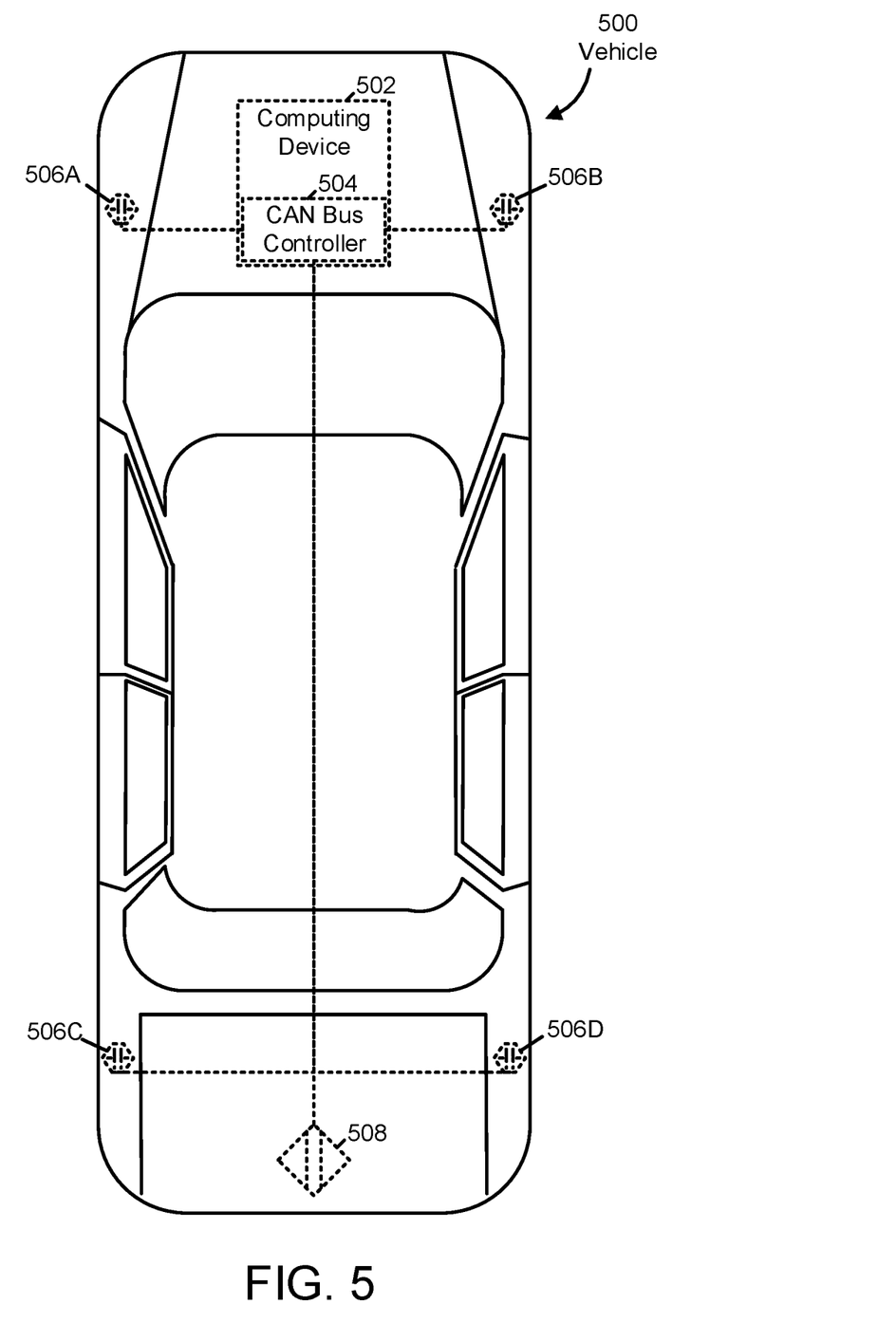
FIG. 5 is a schematic diagram of a vehicle including the computing device of FIG. 3 further configured to isolate a CAN bus in accordance with an example of the present disclosure.

FIG. 5 illustrates a vehicle 500. The vehicle 500 includes a computing device 502, tire pressure sensors 506A-506D (referred to in the collective as the tire pressure sensors 506 and as generic individuals as a tire pressure sensor 506), and a proximity sensor 508. The computing device 502 includes the components of the computing device 300 and a CAN bus controller 504 that is coupled to the interconnect of the computing hardware 102. As shown in FIG. 5, the tire pressure sensors 506, the proximity sensor 508, and the CAN bus controller 504 are coupled to one another via a CAN bus, which is illustrated as a set of dashed lines between these components.

In some examples, the CAN bus controller 504 is configured to access the memory 110 directly via direct memory access (DMA) requests to the DMA controller 126. In these examples, the CAN bus controller 504 is configured to receive input data from the sensors 506 and 508 and to transmit DMA requests to write this input data to one or more predefined memory addresses in the memory 110s. The DMA controller 126 is configured to transmit, upon completion of these DMA requests, a notification to the lightweight VMM 306. This notification may be a specific interrupt that the lightweight VMM 306 is configured to process.

In certain examples, the lightweight VMM 306 is configured to execute only the VM 108N, which includes the TEE 122 and the applications 124. Further, in these examples, the lightweight VMM 306 is further configured to isolate the CAN bus controller 504 by virtualizing the memory 110. By so doing, the VMM 306 ensures that only processes executed by the VM 108N can access the one or more predefined memory address at which the CAN bus controller 504 may store input data.

In some examples, the computing device 502 is configured to execute a process by which sensor data generated by the sensors 506 and 508 is received and analyzed. In these examples, the sensors 506 and 508 transmit the sensor data to the CAN bus controller 504. The CAN bus controller 504 receives the sensor data and transmits a DMA request to the DMA controller 126 to write the sensor data as input data at the one or more predefined memory addresses. After the input data is stored at the one or more predefined memory address, the DMA controller 126 notifies the lightweight VMM 306 of the presence of the input data. Upon receipt of this notification, the lightweight VMM 306 and the virtual machine 108 collaborative execute an interrupt handling process 600 illustrated in FIG. 6.

Figure 6:
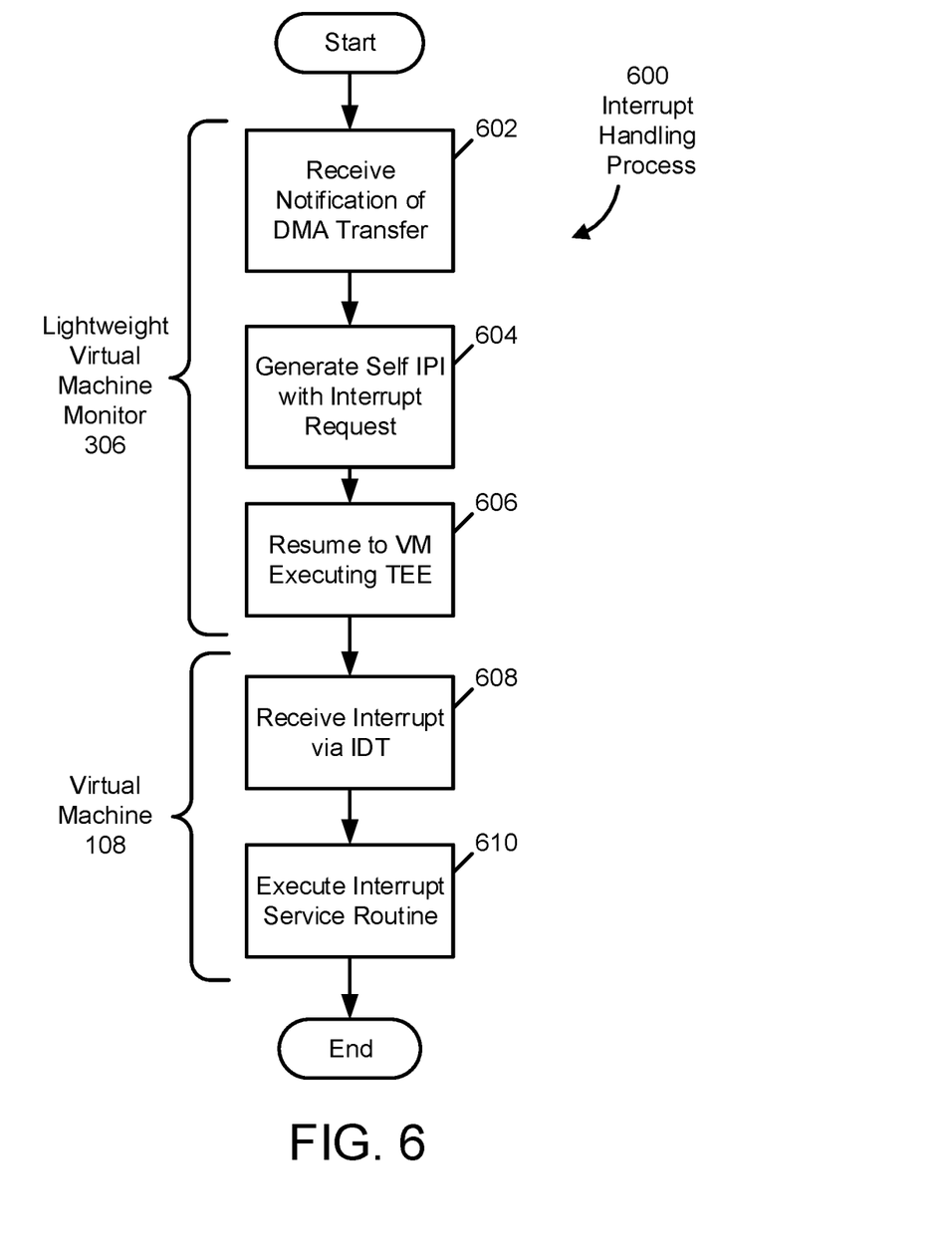
FIG. 6 is a flow diagram illustrating an interrupt handling process executable by the computing device of FIG. 3 in accordance with an example of the present disclosure.

As shown in FIG. 6, the interrupt handling process 600 starts in act 602 with the lightweight VMM 306 receiving the notification indicating available input data from the DMA controller 126. In act 604, the lightweight VMM 306 generates a self IPI. In act 606, the lightweight VMM 306 resumes execution of the VM 108N. In act 608, the VM 108N receives an external interrupt resulting from the self IPI via its IDT. In act 610, the VM 108N executes an ISR associated with the external interrupt to process the input data.

Each of the processes depicted herein includes one sequence of acts in one example. The acts included in these processes may be performed by, or using, one or more computing devices specially configured as discussed herein. Some acts are optional and, as such, may be omitted in accord with one or more examples. Additionally, the order of acts can be altered, or other acts can be added, without departing from the scope of the systems and methods discussed herein.

As described above, the processor 112 may be general purpose processor. However, when executing a specific software process as described herein (e.g., as depicted in any of FIGS. 2 and/or 4), the processor 112 becomes a special purpose processor capable of making specific logic-based determinations based on input data received, and further capable of providing one or more outputs that can be used to control or otherwise inform subsequent processing to be carried out by the processor 112 and/or other processors or circuitry with which processor 112 is communicatively coupled. The processor 112 reacts to specific input stimulus in a specific way and generates a corresponding output based on that input stimulus. In this sense, the structure of processor 112 according to one embodiment is defined by the processes shown in any of FIGS. 2 and/or 4. Moreover, in some example cases, the processor 112 proceeds through a sequence of logical transitions in which various internal register states and/or other bit cell states internal or external to the processor 112 may be set to logic high or logic low. This specific sequence of logic transitions is determined by the state of electrical input signals to the processor 112 and a special-purpose structure is effectively assumed by the processor 112 when executing each software instruction of the processes shown in FIGS. 2 and/or 4. Specifically, those instructions anticipate the various stimulus to be received and change the implicated memory states accordingly. In this way, the processor 112 may generate and store or otherwise provide useful output signals. Thus, it is appreciated that the processor 112, during execution of a software process becomes a special purpose machine, capable of processing only specific input signals and rendering specific output signals based on the one or more logic operations performed during execution of each instruction. In at least some examples, the processor 112 is configured to execute a function where software is stored in a data storage device coupled with the processor 112 (e.g., the memory 110) and that software is configured to cause the processor 112 to proceed through a sequence of various logic operations that result in the function being executed.

Moreover, various examples may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Whether hardware elements and/or software elements are used may vary from one example to the next in accordance with any number of factors, such as desired computational rate, power levels, heat tolerances, processing cycle budget, input data rates, output data rates, memory resources, data bus speeds and other design or performance constraints.

Some examples may be implemented, for example, using a non-transitory machine-readable medium or article or computer program product which may store an instruction or a set of instructions that, if executed by a machine, may cause the machine to perform a method, process, and/or operations in accordance with an example of the present disclosure. Such a machine may include, for example, any suitable processing platform, computing platform, computing device, processing device, computing system, processing system, computer, processor, or the like, and may be implemented using any suitable combination of hardware and software. The machine-readable medium or article may include, for example, any suitable type of memory unit, memory device, memory article, memory) medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of executable code implemented using any suitable high-level, low-level, object-oriented, visual, compiled and/or interpreted programming language.

Further Example Embodiments

The following examples pertain to further embodiments, from which numerous permutations and configurations will be apparent.

Example 1 is a computing device comprising a memory, at least one processor coupled to the memory, and an advanced programmable interrupt controller (APIC) comprised within the at least one processor. The at least one processor is configured to execute a lightweight virtual machine monitor (VMM); execute a virtual machine under control of the lightweight VMM; and generate, via execution of the lightweight VMM, a self inter-processor interrupt (IPI) comprising an identifier of an external interrupt. The advanced programmable interrupt controller (APIC) is configured to receive the self IPI; identify the external interrupt; and deliver the external interrupt to the virtual machine.

Example 2 includes the subject matter of Example 1, wherein the lightweight VMM is further configured to virtualize hardware other than the APIC.

Example 3 includes the subject matter of either Example 1 or Example 2, wherein the lightweight VMM is further configured to allocate a first virtual machine control structure (VMCS) to manage execution of the virtual machine; allocate a second VMCS to manage execution of the lightweight VMM, the second VMCS comprising a Pin-Based VM-Execution Controls field; and write a value of 0 in bit[0] of the Pin-Based VM-Execution Controls field of the second VMCS.

Example 4 includes the subject matter of any of Examples 1 through 3, wherein the lightweight VMM is further configured to initiate execution of the virtual machine.

Example 5 includes the subject matter of any of Example 1 through 4, wherein the APIC comprises and interrupt command register (ICR) and the lightweight VMM is configured to generate the self IPI at least in part by writing one or more values to the ICR.

Example 6 includes the subject matter of any of Examples 1 through 5, wherein the virtual machine comprises an interrupt descriptor table (IDT) and the APIC is configured to deliver the external interrupt at least in part by writing an identifier of the external interrupt to the IDT.

Example 7 includes the subject matter of any of Examples 1 through 6, wherein the virtual machine is configured to execute an interrupt service routine (ISR) in response to detecting the external interrupt, the ISR being configured to process input data stored at a predefined address within the memory and the lightweight VMM is further configured to virtualize the memory; virtualize the processor without virtualizing the APIC; receive a notification indicating that input data is available at the predefined address; and generate the self IPI in response to receiving the notification.

Example 8 includes the subject matter of Example 7, further comprising a controller area network (CAN) bus controller coupled to a CAN bus and the memory and configured to receive the input data via the CAN bus; and store the input data at the predefined address.

Example 9 includes the subject matter of Example 8, wherein CAN bus is disposed within a vehicle.

Example 10 is a method of delivering an external interrupt to a virtual machine using a lightweight virtual machine monitor (VMM). The method comprises executing, via at least one processor of a computing device, the lightweight VMM; executing, via the at least one processor of the computing device, a virtual machine under control of the lightweight VMM; generating, via execution of the lightweight VMM, a self inter-processor interrupt (IPI) comprising an identifier of an external interrupt; receiving, via an advanced programmable interrupt controller (APIC), the self IPI; identifying, via the APIC, the external interrupt; and delivering, via the APIC, the external interrupt to the virtual machine.

Example 11 includes the subject matter of Example 10, further comprising virtualizing hardware other than the APIC.

Example 12 includes the subject matter of either Example 10 or Example 11, further comprising allocating a first virtual machine control structure (VMCS) to manage execution of the virtual machine; allocating a second VMCS to manage execution of the lightweight VMM, the second VMCS comprising a Pin-Based VM-Execution Controls field; and writing a value of 0 in bit[O] of the Pin-Based VM-Execution Controls field of the second VMCS.

Example 13 includes the subject matter of any of Examples 10 through 12, further comprising initiating execution of the virtual machine by the lightweight VMM.

Example 14 includes the subject matter of any of Examples 10 through 13, wherein generating the self IPI comprises writing one or more values to an interrupt command register.

Example 15 includes the subject matter of any of Examples 10 through 14, wherein delivering the external interrupt comprises writing an identifier of the external interrupt to an interrupt descriptor table of the virtual machine.

Example 16 includes the subject matter of any of Examples 10 through 15, further comprising virtualizing, via execution of the lightweight VMM, memory of the computing device; virtualizing, via execution of the lightweight VMM, the processor without virtualizing the APIC; receiving, via execution of the lightweight VMM, a notification indicating that input data is available at a predefined address within the memory; generating the self IPI in response to receiving the notification; executing, via execution of the virtual machine, an interrupt service routine (ISR) in response to detecting the external interrupt; and processing, via execution of the ISR input data stored at the predefined address.

Example 17 includes the subject matter of Example 16, further comprising receiving the input data via a CAN bus and storing the input data at the predefined address.

Example 18 includes the subject matter of Example 17, wherein receiving the input data comprises receiving the input data via a CAN bus is disposed within a vehicle.

Example 19 is a non-transitory computer readable medium encoded with instructions that when executed by one or more processors cause a process delivering interrupts to a virtual machine to be carried out. The process comprises executing, via at least one processor of a computing device, a lightweight VMM; executing, via the at least one processor of the computing device, a virtual machine under control of the lightweight VMM; generating, via execution of the lightweight VMM, a self inter-processor interrupt (IPI) comprising an identifier of an external interrupt; receiving, via an advanced programmable interrupt controller (APIC), the self IPI; identifying, via the APIC, the external interrupt; and delivering, via the APIC, the external interrupt to the virtual machine.

Example 20 includes the subject matter of Example 19, wherein the process further comprises virtualizing hardware other than the APIC.

Example 21 includes the subject matter of either Example 19 or Example 20, wherein the process further comprises allocating a first virtual machine control structure (VMCS) to manage execution of the virtual machine; allocating a second VMCS to manage execution of the lightweight VMM, the second VMCS comprising a Pin-Based VM-Execution Controls field; and writing a value of 0 in bit[0] of the Pin-Based VM-Execution Controls field of the second VMCS.

Example 22 includes the subject matter of any of Examples 19 through 21, wherein the process further comprises initiating execution of the virtual machine by the lightweight VMM.

Example 23 includes the subject matter of any of Examples 19 through 22, wherein generating the self IPI comprises writing one or more values to an interrupt command register.

Example 24 includes the subject matter of any of Examples 19 through 23, wherein delivering the external interrupt comprises writing an identifier of the external interrupt to an interrupt descriptor table of the virtual machine.

Example 25 includes the subject matter of any of Examples 19 through 24, wherein the process further comprises virtualizing, via execution of the lightweight VMM, memory of the computing device; virtualizing, via execution of the lightweight VMM, the processor without virtualizing the APIC; receiving, via execution of the lightweight VMM, a notification indicating that input data is available at a predefined address within the memory; generating the self IPI in response to receiving the notification; executing, via execution of the virtual machine, an interrupt service routine (ISR) in response to detecting the external interrupt; and processing, via execution of the ISR, input data stored at the predefined address.

Example 26 includes the subject matter of Example 25, wherein the process further comprises receiving the input data via a CAN bus; and storing the input data at the predefined address.

Example 27 includes the subject matter of Example 26, wherein receiving the input data comprises receiving the input data via a CAN bus is disposed within a vehicle.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

The invention claimed is:

1. A computing device comprising:
 a memory;
 at least one processor coupled to the memory and configured to
 execute a lightweight virtual machine monitor (VMM),
 execute a virtual machine under control of the lightweight VMM, and
 generate, via execution of the lightweight VMM, a self inter-processor interrupt (IPI) comprising an identifier of an external interrupt; and
 an advanced programmable interrupt controller (APIC) comprised within the at least one processor and configured to
 receive the self IPI,
 identify the external interrupt, and
 deliver the external interrupt to the virtual machine.

2. The computing device of claim 1, wherein the lightweight VMM is further configured to virtualize hardware other than the APIC.

3. The computing device of claim 2, wherein the lightweight VMM is further configured to:
   allocate a first virtual machine control structure (VMCS) to manage execution of the virtual machine;
   allocate a second VMCS to manage execution of the lightweight VMM, the second VMCS comprising a Pin-Based VM-Execution Controls field; and
   write a value of 0 in bit[0] of the Pin-Based VM-Execution Controls field of the second VMCS.

4. The computing device of claim 1, wherein the lightweight VMM is further configured to initiate execution of the virtual machine.

5. The computing device of claim 1, wherein the APIC comprises and interrupt command register (ICR) and the lightweight VMM is configured to generate the self IPI at least in part by writing one or more values to the ICR.

6. The computing device of claim 1, wherein the virtual machine comprises an interrupt descriptor table (IDT), and the APIC is configured to deliver the external interrupt at least in part by writing an identifier of the external interrupt to the IDT.

7. The computing device of claim 1, wherein the virtual machine is configured to execute an interrupt service routine (ISR) in response to detecting the external interrupt, the ISR being configured to process input data stored at a predefined address within the memory and the lightweight VMM is further configured to:
   virtualize the memory;
   virtualize the processor without virtualizing the APIC;
   receive a notification indicating that input data is available at the predefined address; and
   generate the self IPI in response to receiving the notification.

8. The computing device of claim 7, further comprising a controller area network (CAN) bus controller coupled to a CAN bus and the memory and configured to:
   receive the input data via the CAN bus; and
   store the input data at the predefined address.

9. The computing device of claim 8, wherein the CAN bus is disposed within a vehicle.

10. A method of delivering an external interrupt to a virtual machine using a lightweight virtual machine monitor (VMM), the method comprising:
   executing, via at least one processor of a computing device, the lightweight VMM;
   executing, via the at least one processor of the computing device, a virtual machine under control of the lightweight VMM;
   generating, via execution of the lightweight VMM, a self inter-processor interrupt (IPI) comprising an identifier of an external interrupt;
   receiving, via an advanced programmable interrupt controller (APIC), the self IPI;
   identifying, via the APIC, the external interrupt; and
   delivering, via the APIC, the external interrupt to the virtual machine.

11. The method of claim 10, further comprising:
   allocating a first virtual machine control structure (VMCS) to manage execution of the virtual machine;
   allocating a second VMCS to manage execution of the lightweight VMM, the second VMCS comprising a Pin-Based VM-Execution Controls field; and
   writing a value of 0 in bit[0] of the Pin-Based VM-Execution Controls field of the second VMCS.

12. The method of claim 10, wherein:
   generating the self IPI comprises writing one or more values to an interrupt command register; and/or
   delivering the external interrupt comprises writing an identifier of the external interrupt to an interrupt descriptor table of the virtual machine.

13. The method of claim 10, further comprising:
   virtualizing, via execution of the lightweight VMM, memory of the computing device;
   virtualizing, via execution of the lightweight VMM, the processor without virtualizing the APIC;
   receiving, via execution of the lightweight VMM, a notification indicating that input data is available at a predefined address within the memory;
   generating the self IPI in response to receiving the notification;
   executing, via execution of the virtual machine, an interrupt service routine (ISR) in response to detecting the external interrupt; and
   processing, via execution of the ISR, input data stored at the predefined address.

14. The method of claim 13, wherein the input data is received via a controller area network (CAN) bus that is disposed within a vehicle.

15. A computer program product including one or more non-transitory machine-readable mediums encoded with instructions that when executed by one or more processors cause a process to be carried out for delivering interrupts to a virtual machine, the process comprising:
   executing, via at least one processor of a computing device, a lightweight VMM;
   executing, via the at least one processor of the computing device, a virtual machine under control of the lightweight VMM;
   generating, via execution of the lightweight VMM, a self inter-processor interrupt (IPI) comprising an identifier of an external interrupt;
   receiving, via an advanced programmable interrupt controller (APIC), the self IPI;
   identifying, via the APIC, the external interrupt; and
   delivering, via the APIC, the external interrupt to the virtual machine.

16. The computer program product of claim 15, wherein the process further comprises:
   allocating a first virtual machine control structure (VMCS) to manage execution of the virtual machine;
   allocating a second VMCS to manage execution of the lightweight VMM, the second VMCS comprising a Pin-Based VM-Execution Controls field; and
   writing a value of 0 in bit[0] of the Pin-Based VM-Execution Controls field of the second VMCS.

17. The computer program product of claim 15, wherein:
   generating the self IPI comprises writing one or more values to an interrupt command register; and/or
   delivering the external interrupt comprises writing an identifier of the external interrupt to an interrupt descriptor table of the virtual machine.

18. The computer program product of claim 15, wherein the process further comprises:
   virtualizing, via execution of the lightweight VMM, memory of the computing device;
   virtualizing, via execution of the lightweight VMM, the processor without virtualizing the APIC;
   receiving, via execution of the lightweight VMM, a notification indicating that input data is available at a predefined address within the memory;
   generating the self IPI in response to receiving the notification;

executing, via execution of the virtual machine, an interrupt service routine (ISR) in response to detecting the external interrupt; and processing, via execution of the ISR, input data stored at the predefined address.

19. The computer program product of claim 18, wherein the process further comprises:

receiving the input data via a controller area network (CANS bus; and storing the input data at the predefined address.

20. The computer program product of claim 19, wherein the CAN bus is disposed within a vehicle.

\* \* \* \* \*